(12) United States Patent
Ozawa (10) Patent No.: US 6,254,706 B1
(45) Date of Patent: Jul. 3, 2001

(54) METHOD OF PRODUCING CYLINDRICAL VIBRATION-PROOFING RUBBER DEVICE

(75) Inventor: Shogo Ozawa, Saitama (JP)

(73) Assignee: Yamashita Rubber Kabushiki Kaisha, Saitama (JP)

( * ) Notice: Subject to any disclaimer, the term of this patent is extended or adjusted under 35 U.S.C. 154(b) by 0 days.

(21) Appl. No.: 09/297,634

(22) PCT Filed: Oct. 13, 1998

(86) PCT No.: PCT/JP98/04610

§ 371 Date: Jul. 8, 1999

§ 102(e) Date: Jul. 8, 1999

(87) PCT Pub. No.: WO99/19642

PCT Pub. Date: Apr. 22, 1999

(30) Foreign Application Priority Data

Oct. 14, 1997  (JP) ................................................ H9-280645

(51) Int. Cl.$^7$ ............................. B32B 31/04; B23K 26/32
(52) U.S. Cl. ...................... 156/64; 219/121.64; 248/562; 267/140.12; 156/272.8
(58) Field of Search ............................. 156/272.8, 275.1, 156/64; 219/121.64; 267/140.12; 248/562, 635, 636, 638, 671, 678

(56) References Cited

U.S. PATENT DOCUMENTS 4,626,653 * 12/1986 Sciaky et al. .................... 219/121.64
5,769,380 *  6/1998 Hibi et al. ............................. 248/562

FOREIGN PATENT DOCUMENTS 61-112142  7/1986  (JP) .
 7-75843   3/1995  (JP) .

* cited by examiner

Primary Examiner—Michael W. Ball
Assistant Examiner—Michael A. Tolin
(74) Attorney, Agent, or Firm—Birch, Stewart, Kolasch & Birch, LLP

(57) ABSTRACT

A vibration isolating functional member 16 is formed of an inner cylinder 1, an outer cylinder 2, and a vibration isolating rubber 3. Thereafter an end face of a flange 10 of the outer cylinder 2 is joined with a bracket side connecting surface 15 of a bracket 4 and the joint portion thereof is laser welded. In this time, the outer peripheral end face of the flange 10 as the joining portion projects toward a position apart from the vibration isolating rubber 3 such as giving no thermal influence to the vibration isolating rubber 3. This position to give no thermal influence to the rubber is determined by an experiment based on a welded material, thickness thereof, laser welding conditions (such as melting depth, output power and welding speed), surface temperature limit of the rubber and so on.

9 Claims, 14 Drawing Sheets

| No. | LACK OF RUBBER OWING TO UNSTICKING | | WELDING CONDITIONS |
|---|---|---|---|
| | UNSTUCK CROSS - SECTION | STICKING STATE AT 5mm | |
| 1 |  | PASS | OUTPUT POWER : 3kW<br>SPPED : 2500mm/min<br>MAX.TEMP : 140℃ |
| 2 |  | PASS | OUTPUT POWER : 3kW<br>SPPED : 3500mm/min<br>MAX.TEMP : 132℃ |
| 3 |  | FAIL | OUTPUT POWER : 3kW<br>SPPED : 1500mm/min<br>MAX.TEMP : 244℃ |
| 4 |  | FAIL | OUTPUT POWER : 5kW<br>SPPED : 3500mm/min<br>MAX.TEMP : 184℃ |
| 5 |  | PASS | OUTPUT POWER : 5kW<br>SPPED : 4500mm/min<br>MAX.TEMP : 160℃ |
| 6 |  | FAIL | OUTPUT POWER : 5kW<br>SPPED : 2500mm/min<br>MAX.TEMP : 199℃ |

METHOD OF PRODUCING CYLINDRICAL VIBRATION-PROOFING RUBBER DEVICE

FIELD OF THE INVENTION

The present invention relates to a manufacturing process of a cylindrical vibration isolating rubber device used for an engine mount of a vehicle and the like.

1. Description of the Prior Art

Various types of such a cylindrical vibration isolating rubber device are known. For example, such a device discloses an inner cylinder secured to one side of an engine or a vehicle body, an outer cylinder secured to another side thereof through a bracket, and a vibration isolating rubber connecting the inner cylinder and the outer cylinder, wherein the vibration isolating device is formed by means of molding including the steps of: laying the inner cylinder and the outer cylinder within a molding die such that the inner cylinder is arranged concentrically or eccentrically inside the outer cylinder, pouring liquid rubber into the die, tightening the die, and vulcanizing the rubber.

In a case that a bracket is welded to an outer cylinder, if vibration isolating rubber has been beforehand baked on an inside of the outer cylinder, the vibration isolating rubber suffer a harmful influence. Hence, it is required that the bracket is welded at first to the outer cylinder and then the vibration isolating rubber is baked on the inside of the outer cylinder. However, when such a process is adopted, since the bracket, a shape of which is apt to be complex, have to be housed in a die with the outer cylinder, such a problem occurs that it is unavoidable to use a complex and large die for formation of the vibration isolating device. Therefore, such a manufacturing process is required that a vibration isolating functional member including an inner cylinder, an outer cylinder and vibration isolating rubber is beforehand formed and thereafter the bracket is molded to the outer cylinder without giving thermal influence to the vibration isolating rubber.

2. Disclosure of the Invention

In order to solve the above subject, there is provided a manufacturing process of a cylindrical vibration isolating device comprising a vibration isolating functional member including a metal-made outer cylinder, a metal-made inner cylinder provided inside the outer cylinder and a vibration isolating rubber combined between the outer cylinder and the inner cylinder, and a fixing bracket welded to the outer cylinder, comprises the steps of forming the vibration insulating functional member, placing the bracket on an axial end portion of the outer cylinder projecting toward a position to give no thermal damage to the vibration isolating rubber and laser-welding the joint portion of the axial end portion of the outer cylinder and the bracket.

By thermal damage to the vibration isolating rubber, we mean such a harmful damage as detaching the rubber from the outer cylinder or denaturalization of the rubber such as lowering the required physical property on account of the vibration isolating rubber suffering from heat more than the upper temperature limit. And giving no thermal damage to the vibration isolating rubber means not effecting such a harmful damage to the vibration isolating rubber.

The axial end portion of the outer cylinder projects toward the position to give no thermal damage to the vibration insulating rubber. Hence, when the axial end portion and the bracket are joined and the joint portion of both members is laser-welded, the bracket is welded to the outer cylinder and the welding heat in this time gives no influence to the vibration isolating rubber.

Therefore, it becomes possible to weld the bracket to the outer cylinder after forming of the vibration isolating function member and to utilize a simple and small die for forming. Which make it much easy to manufacture the vibration isolating device. Moreover, since a common vibration insulating function member can be combined with various kinds of a bracket, the vibration isolating device can be manufactured advantageously.

Furthermore, since laser- welding makes it possible to weld in an extremely narrow width and a range to give thermal damage to the vibration isolating rubber becomes exceedingly narrow, the welding portion can be correspondingly approached to the vibration isolating rubber. Accordingly, the vibration isolating device as a whole can be made in a small-size and a light-weight.

The axial end portion of the outer cylinder may extend axially outwardly to the place to give no thermal damage to the vibration isolating rubber and the joint portion of an end face of the extending portion may be welded to the bracket, thereby it becomes possible to miniaturize the vibration isolating rubber device so as not to be expanded toward the radial direction. Moreover, by way of adopting the laser welding, it is possible to weld easily and with sufficient strength even in the narrow area such as the end face at the axial end portion of the outer cylinder.

The flange may be formed so as to bend radially outwardly at the end portion of the outer cylinder and to position a tip end face of the flange in a position to give no thermal damage to the rubber, and the joint portion of the end face of the flange may be welded to the bracket. Accordingly, it becomes easy to position the end portion of the outer cylinder at the place to give no thermal influence to the vibration insulating rubber, and in addition, it is possible to miniaturize the vibration isolating device so as not to expand a size thereof in an axial direction.

The step may comprise, setting melting depth by welding so as to be more than the thickness of a welded material; determining a laser output power and adequate welding speed according to the melting depth by an experiment; deciding a surface temperature limit determined through an experiment according to composition of the vibration isolating rubber; deciding an adequate distance from a welding line to a point to become less than the surface temperature limit when being welded with the selected laser output power and adequate welding speed by an experiment; and determining a position to keep the adequate distance from the vibration isolating rubber as said position to give no thermal damage to the rubber.

The laser output power and the welding speed are determined on the basis of the melting depth decided as the depth more than the thickness of the welded material. On the other hand, the surface temperature limit is determined by composition of the vibration isolating rubber. Thereafter, the adequate distance is determined according to the laser output power, welding speed and the surface temperature limit allowing for safety margin and is decided as the distance from the rubber to the position to give no thermal influence to the rubber. Therefore, even in a case that conditions are changed variously, the position to give no thermal damage to the rubber is decidable experimentally.

In this case, the adequate welding speed signifies a speed determined by means of the selected laser output power and the melting depth. The surface temperature limit signifies the maximum surface temperature not effecting harmful influence to the vibration isolating rubber, which is determined by the experiment according to composition of the vibration isolating rubber. The adequate distance means a distance from the vibration isolating rubber to a position to give no thermal influence to the rubber. These figures are determined allowing for safety margin.

DESCRIPTION IF THE PREFERRED EMBODIMENT

FIGS. 1 through 5 are relating to the first embodiment adapting the present invention for a cylindrical engine mount.

Figure 1:
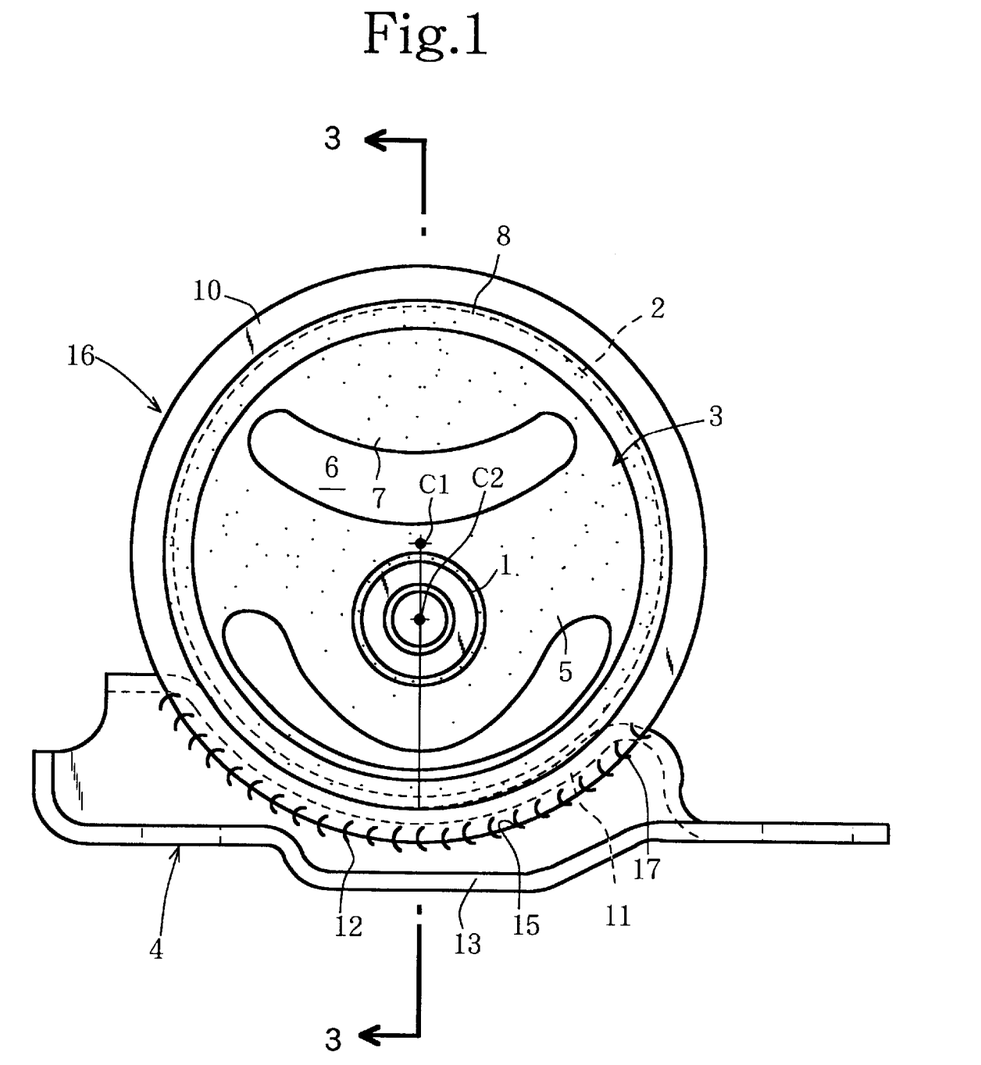
FIG. 1 is an front elevational view of a first embodiment.
Figure 2:
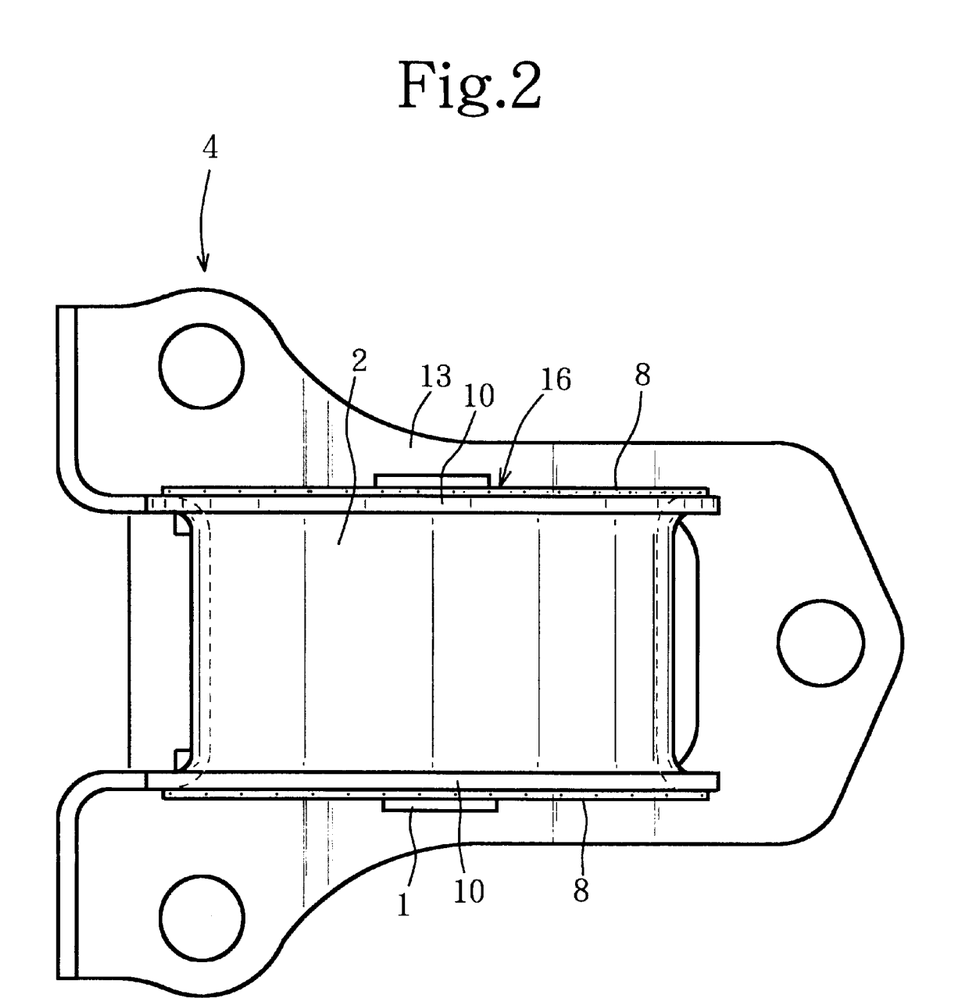
FIG. 2 is a plan view thereof.

In these Figures, a vibration isolating rubber device comprises an inner cylinder 1, an outer cylinder 2, a vibration isolating rubber 3 and a bracket 4, wherein the inner cylinder 1 is arranged eccentrically inside the outer cylinder 2, and the inner cylinder 1 and the outer cylinder 2 are connected by the vibration insulating rubber 3 having a substantially V-shaped arm portion 5 as shown in the front elevational view of FIG. 1.

Reference numeral 6 denotes an axially piercing space, 7 a stopper portion projecting from a remotest part of the outer cylinder away from the inner cylinder 1 toward the inner cylinder 1, and 8 a side stopper formed along the inside of the outer cylinder 2 and projecting axially longer than the outer cylinder 2.

A flange 10 is formed so as to bend radially outwardly on the axially opposite ends of the outer cylinder 2 and the side stopper 8 is continuously formed extending to an outer surface of the flange 10.

Figure 3:
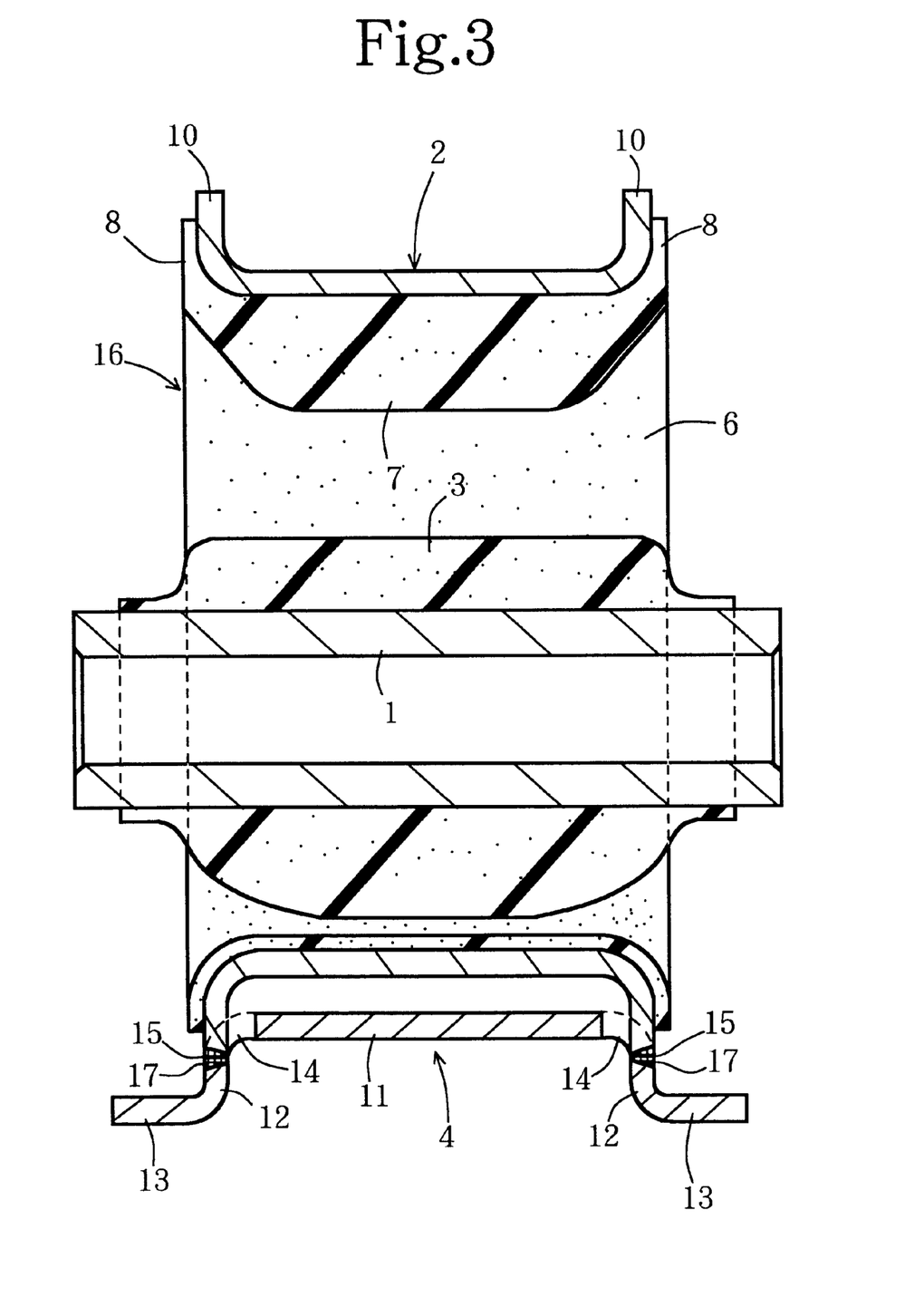
FIG. 3 is a cross-sectional view taken on line 3—3 of FIG. 1.
Figure 4:
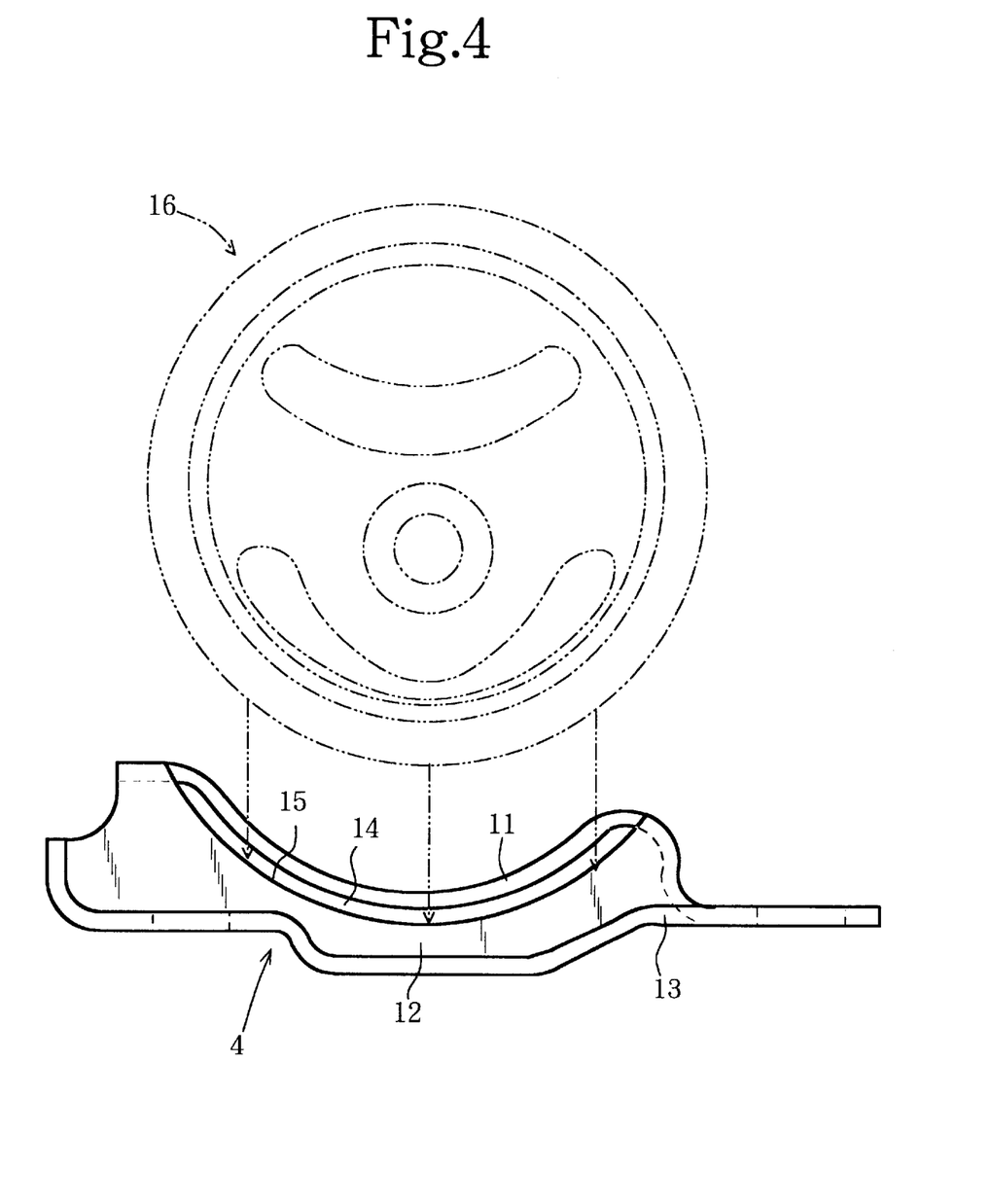
FIG. 4 is a front elevational view of a bracket.
Figure 5:
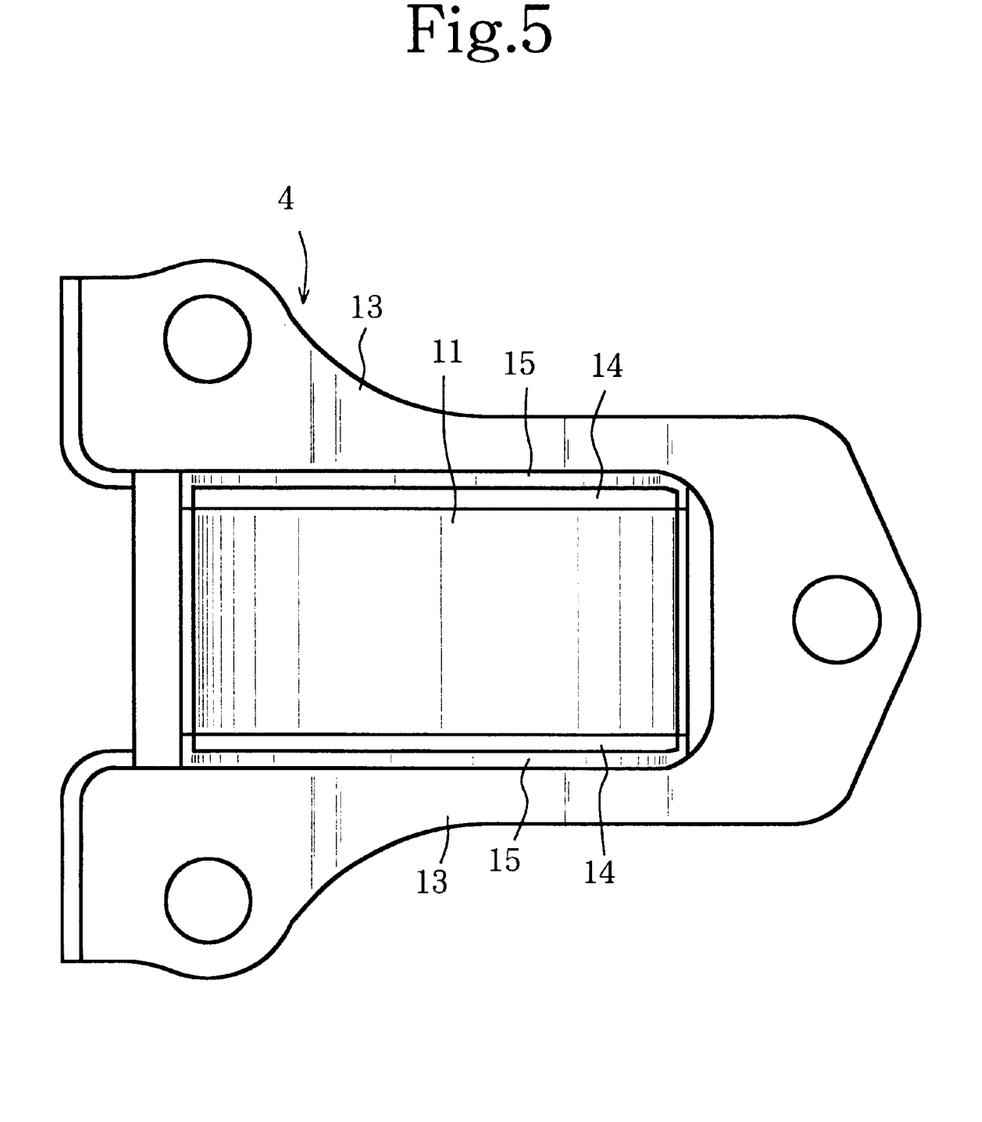
FIG. 5 is a plan view thereof.

As is apparent from FIGS. 3, 4 and 5, the bracket 4 is a press-formed metal member connected to an outer peripheral portion of the outer cylinder 2 with a length of about ⅓ the circumference of the outer cylinder 2. In the bracket 4, as is apparent from FIG. 3, a main body portion 11 is formed so as to enter between the right and left flange 10, a side wall portion 12 bents substantially vertically at right and left sides of the main body portion 11, and a fixing portion 13 is folded back in a flange-like shape from a tip portion of the side wall portion toward the outer side direction.

Hereupon, assuming that a longitudinal direction of the bracket 4 is a direction substantially parallel to a circumferential direction of the outer cylinder 2 and a width direction of the bracket 4 is a direction parallel to an axial direction of the outer cylinder 2, a pair of slits 14 is formed extending to the longitudinal direction on the opposite sides of the main body 11 in the width direction. By means of the slit 14, a portion facing to the outer cylinder 2 in the side wall 12 is adapted to be a bracket side connecting surface 15 contacting to the end face of the flange 10.

The bracket side connecting surface 15 has step-like different height from the main body portion 11 so as to connect with the flange 10. As shown in FIG. 1, a circular center C2 of the bracket side connecting surface 15 is arranged to be slightly eccentric to a center C1 of the flange 10 so that the circular radius of the bracket side connecting surface 15 is slightly shorter than a radius of the flange 10. Namely, the circular center C2 of the bracket side connecting surface 15 is arranged to be slightly smaller than the radius of the flange 10.

The bracket side connecting surface 15 and an outer peripheral end face of the flange 10 are joined and the joint portion is laser-welded from the outside thereof. The length of the welding is arranged to be as much as about ⅓ around the flange 10 as the length of the bracket side connecting surface 15. A position of the outer peripheral end face of the flange 10 to become the connecting portion is adapted to be the position to give no thermal damage to the vibration isolating rubber 3. Namely, a distance from the position of the outer peripheral end face of the flange 10 to the end portion of the vibration insulating rubber 3 is made to be more than the adequate distance L.

Incidentally, in the present embodiment, both the outer cylinder 2 and the bracket 4 are made of a steel plate (for example SPC of Japanese Industrial Standards) of 2.9 mm thickness and the adequate distance L is arranged to be 7.5 mm. The inner cylinder 1, the outer cylinder 2 and the vibration insulating rubber 3 are integrated to constitute a vibration isolating functional member 16.

For manufacturing the vibration-insulating device, beforehand, the inner cylinder 1, the outer cylinder 2 and the bracket 4 are separately formed. Thereafter, the inner cylinder 1 and the outer cylinder 2 are embedded in a die, into which rubber material is filled, and the rubber is vulcanized by an ordinary manner. Consequently, the vibration isolating functional member 16 is formed integrating the inner cylinder 1 and the outer cylinder 2 with the vibration insulating rubber 3.

Next, the vibration insulating functional member 16 is positioned on the bracket 4, the main body portion 11 is fitted between the right and left flanges 10, and the outer peripheral end face of the flange 10 is arranged to coincide with the bracket side connecting surface 15. Thereafter, when the vibration insulating functional portion 16 is pushed toward the bracket 4, the outer peripheral portion of the flange 10 and the bracket side connecting surface 15 are confronted to each other and joined on an entire length of the bracket side contacting surface 15.

At last, the joint portion is welded with, for example, a carbonic acid gas laser of 3 kW output power at a speed of 2500 mm/min. However, as mentioned hereafter, since this welding condition varies variously, it is required to previously determine each various set conditions by the experiments.

This result in that the outer peripheral end surface of the flange 10 of the vibration isolating functional member 16 is integrated with the bracket side connecting surface 15 of the bracket 4 by welding in a state of coinciding with each other.

Reference numeral 17 denotes a welding portion by means of this laser welding.

In the case, it should be noted that since the welding portion is located on the position to give no thermal damage at an adequate distance L away from the end portion of the vibration isolating rubber 3, even if the bracket 4 is welded to the vibration isolating functional member 16 after vulcanizing the rubber, the vibration isolating rubber 3 does not suffer from a bad influence. Therefore, a vibration isolating device of high quality can be much easily manufactured.

Moreover, since the flange 10 is welded at the outer peripheral end face thereof, it is easy to secure the adequate distance L to give no thermal damage to vibration isolating rubber 3 and it is not needed to enlarge a size of the vibration isolating functional member 16 in a radial direction.

In addition, since a radius of the bracket side connecting surface 15 is made to be smaller than that of the outer peripheral portion of the flange 10, even if some disorder occurs in the forming of the bracket side connecting surface 15 and the flange 10, welding can be finished while contacting tightly the bracket side connecting surface 15 and the flange 10 to each other over the entire length of the bracket side connecting surface 15.

Furthermore, adopting of the laser-welding makes it possible to easily weld even in a very limited narrow area such as mutually confronted end faces and to restrict a thermal damage in a small area, hence the adequate distance L can be made as much smaller and the whole device can be made in a smaller size and a lighter weight.

Figure 6:
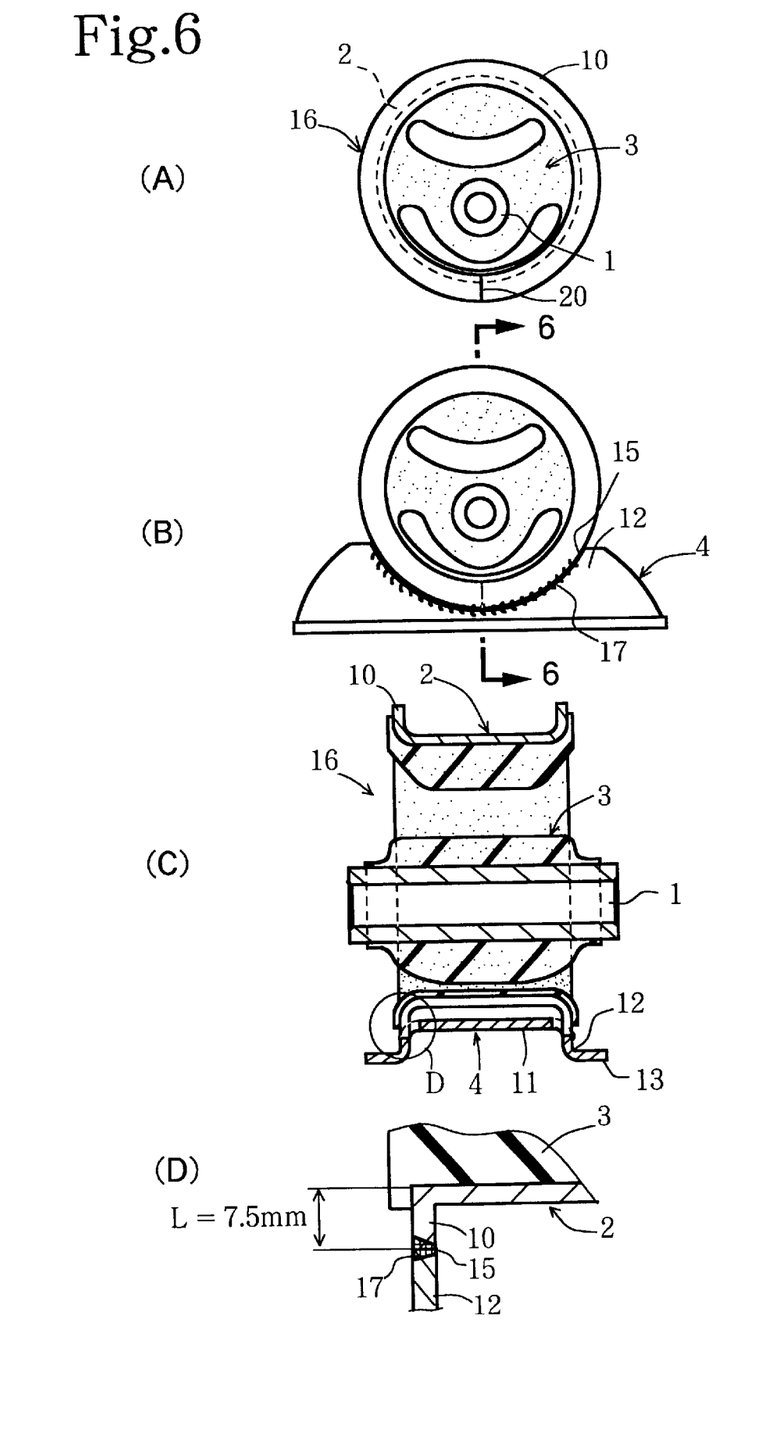
FIGS. 6(A)–6(D) are views showing a second embodiment.
Figure 7:
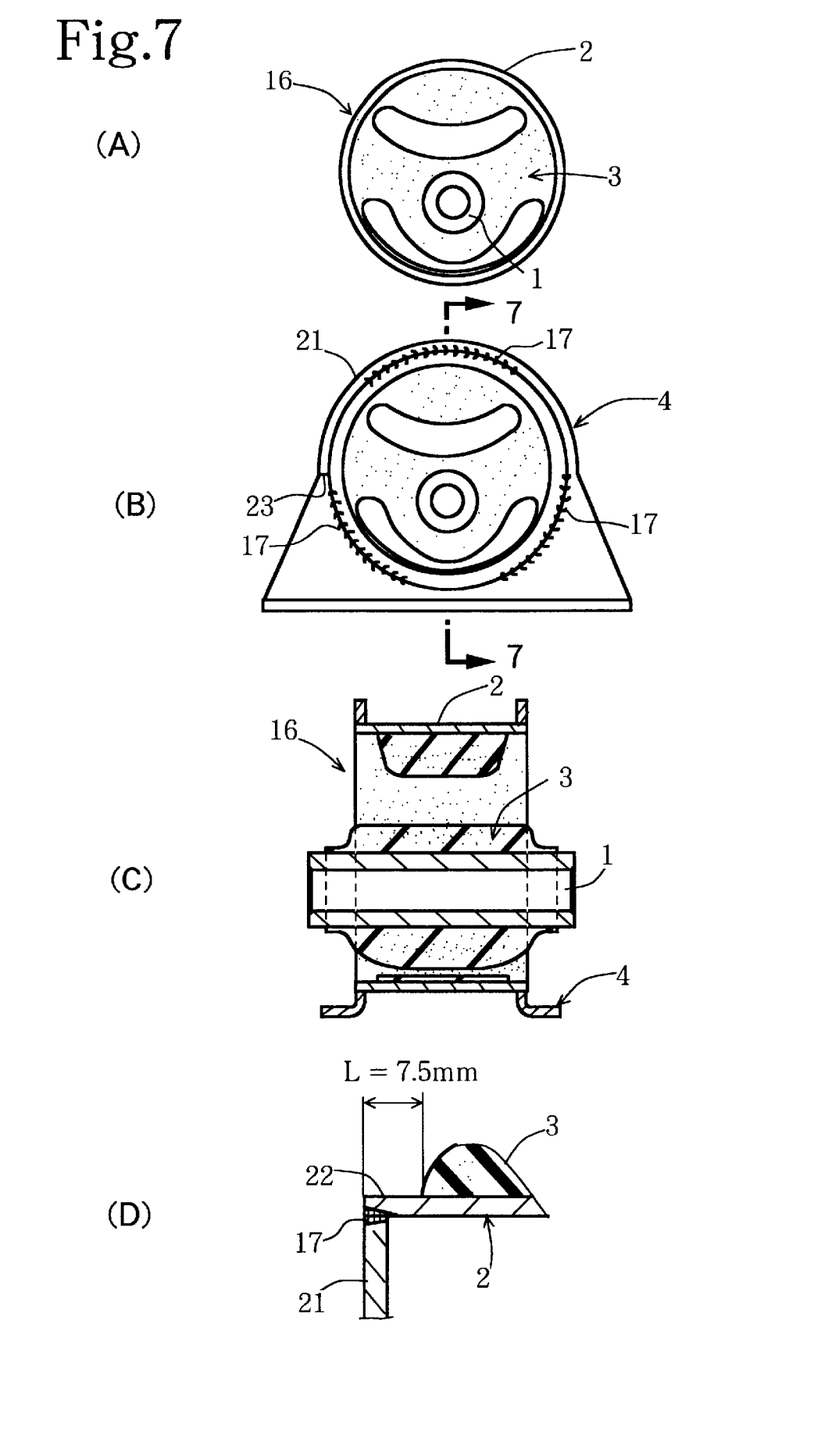
FIGS. 7(A)–7(D) are views showing a third embodiment.
Figure 8:
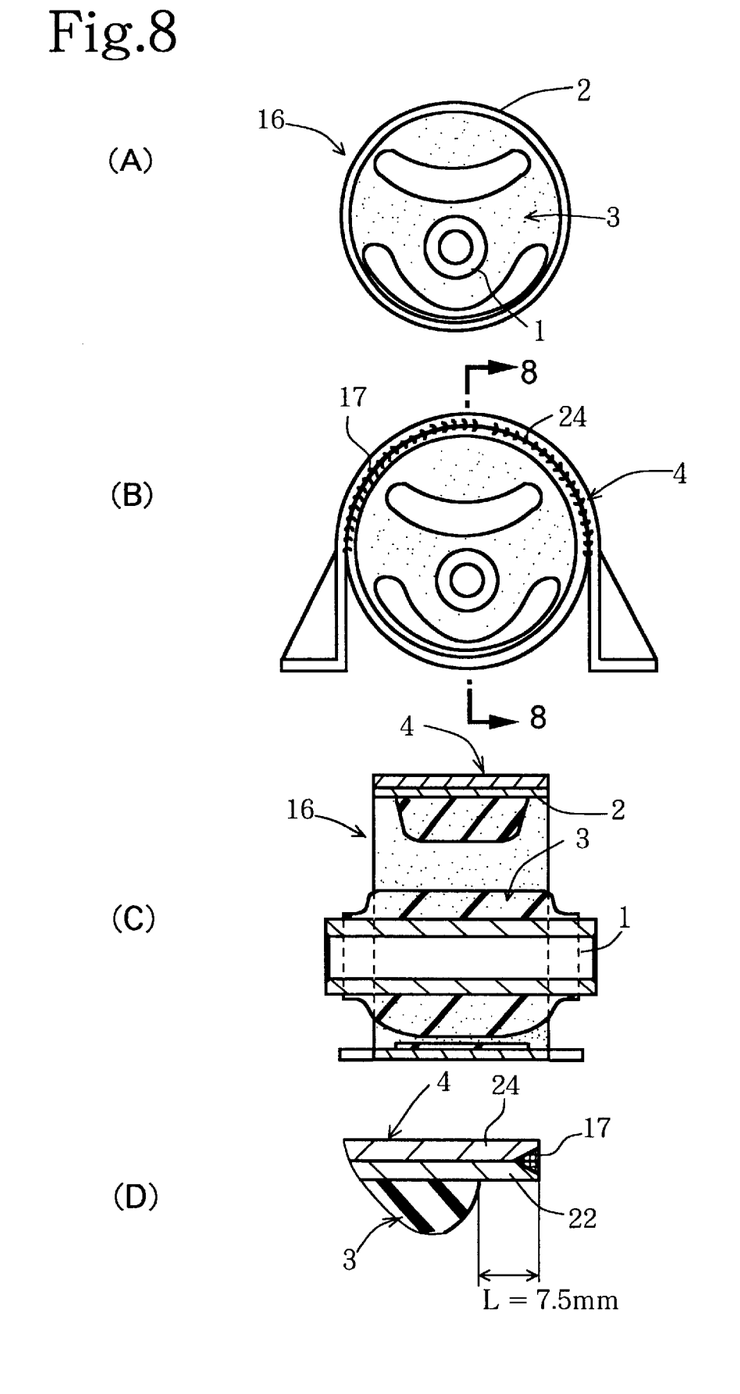
FIGS. 8(A)–8(D) are views showing a fourth embodiment.

FIGS. 6 through 9 show modified examples of such device made as a cylinder-type engine mount. Hereafter, the same functional parts are explained using the same reference numerals. First, the second embodiment in FIG. 6 shows a device in which an outer cylinder 2 thereof is composed of a wound pipe. In the drawing, (A) shows a front elevation of a vibration isolating functional member 16, (B) a front elevation of a bracket 4, (C) a cross-sectional view taken on line 6—6 of (B), and (D) a cross-sectional view of a connecting portion. In FIGS. 7 and 8 also, the similar drawings are shown in (A) to (D).

As is shown in (C) of FIG. 6, the cylinder 2 is laser-welded similarly as a former embodiment in a state that a confronting portion 20 having a slit is made to be in a welding region to the bracket 4. In the case, since width of the slit becomes a tightening margin when the confronting portion is welded with the bracket side connecting surface 15, namely the outer peripheral portion of the flange 10 can be contacted tightly to the bracket side connecting surface 15 while adjusting an opening degree of the slit 20, sticking ability of the flange 10 with the bracket side connecting surface 15 is raised. In this embodiment, the adequate distance L is 7.5 mm.

In the third embodiment of FIG. 7, a bracket 4 is formed in a wound pipe-like shape provided with a cylindrical fitting portion 21 and the vibration insulating functional member 16 is inserted into the fitting portion 21. The axial end portion of the outer cylinder 2 is arranged to be an extending portion 22 which extends outwardly from a vibration isolating rubber 3 by more than 7.5 mm. Each peripheral end face of the extending portion 22 and the fitting portion 21 are evenly overlapped and an overlapped portion of both members is welded on the end face thereof. In FIG. 7, (C) shows a sectional view taken on line 7—7 in (B) of FIG. 7.

When using such a procedure, since the fitting portion 21 of the bracket 4 can be formed as a wound pipe-like shape, sticking ability of the bracket 4 with the vibration isolating functional member 16 can be improved by adjusting an opening degree of a confronting portion 23. Moreover, because the flange is not provided in this embodiment unlike the former one, it is possible to make a size of the device small in a radial direction. In this embodiment, the adequate distance L is 7.5 mm.

In the fourth embodiment of FIG. 8, a wound bracket 4 is used which is formed in substantially a U-shape when viewed from an axial direction of the vibration isolating functional member 16. Thereby it is possible to give a tightening margin to the bracket 4 and to secure good sticking ability between the vibration insulating functional member 16 and the bracket 4. In this case, an axial end portion 22 of the outer cylinder 2 is overlapped on an end portion 24 of the bracket 4. While arranging each end surface of the axial end portion 22 of the outer cylinder 2 and the end portion 24 of the bracket 4 to be substantially coplanar, the contacting portion thereof is laser welded. In this embodiment, the adequate distance L is 7.5 mm. In FIG. 8, (C) shows a cross-sectional view taken on line 8—8 of (B).

Figure 9:
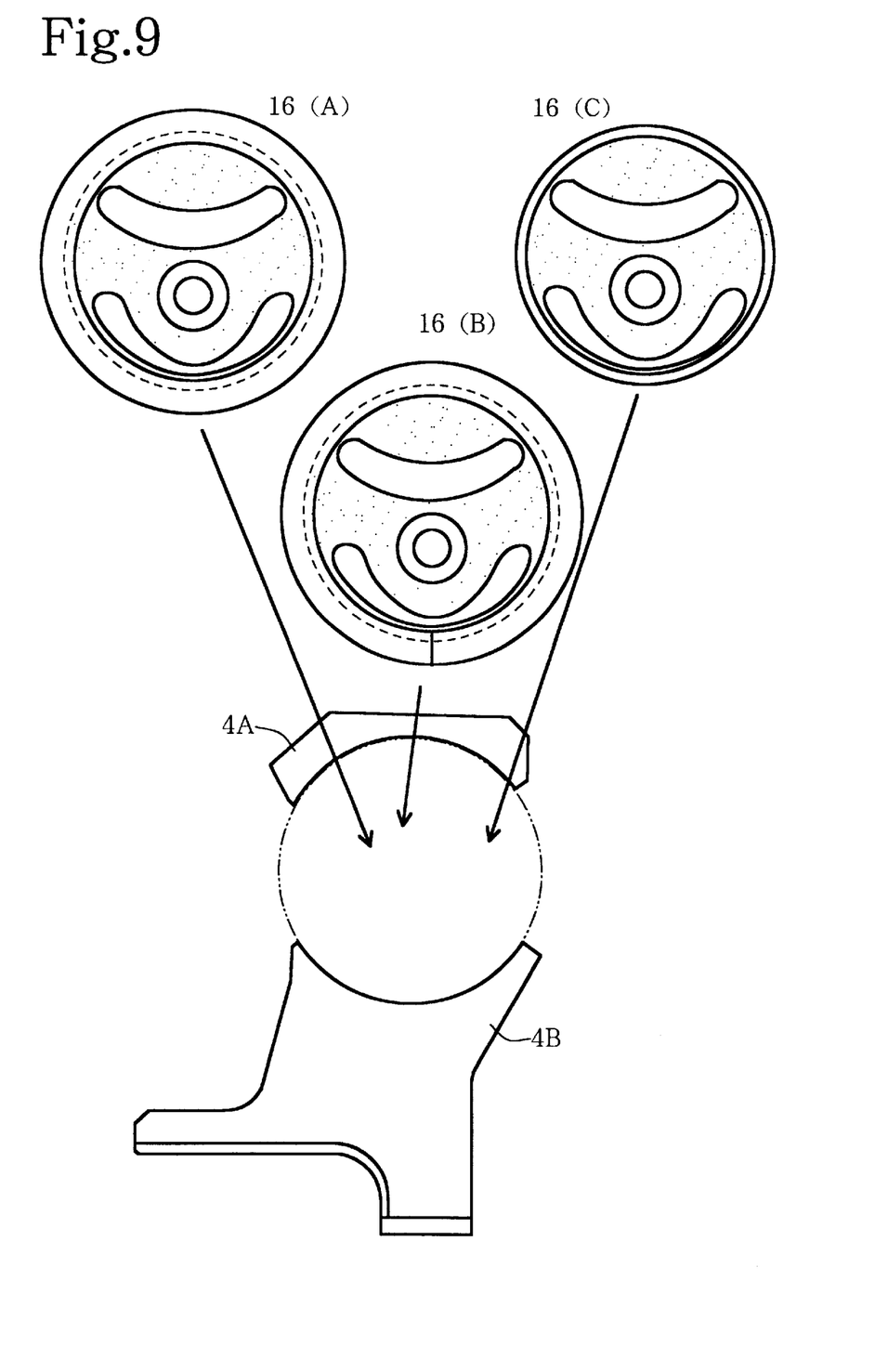
FIG. 9 is a view showing a fifth embodiment.

In the fifth embodiment of FIG. 9, the vibration isolating functional member 16 is interposed between two brackets 4A and 4B at an upper side and a lower side thereof. Each brackets 4A and 4B are positioned on the vibration isolating functional member 16 and welded, for example, as the embodiment of FIG. 1. The number of the bracket can be more than two. Further, each vibration isolating functional members of FIG. 1, FIG. 6 and FIG. 7 shown as 16(A), 16(B) and 16(C) in FIG. 9 can be combined suitably with the bracket 4. On the contrary, the different types of bracket can be properly combined with the common vibration insulating functional member 16. Hence it is much advantageous in manufacturing the vibration insulating device.

Figure 10:
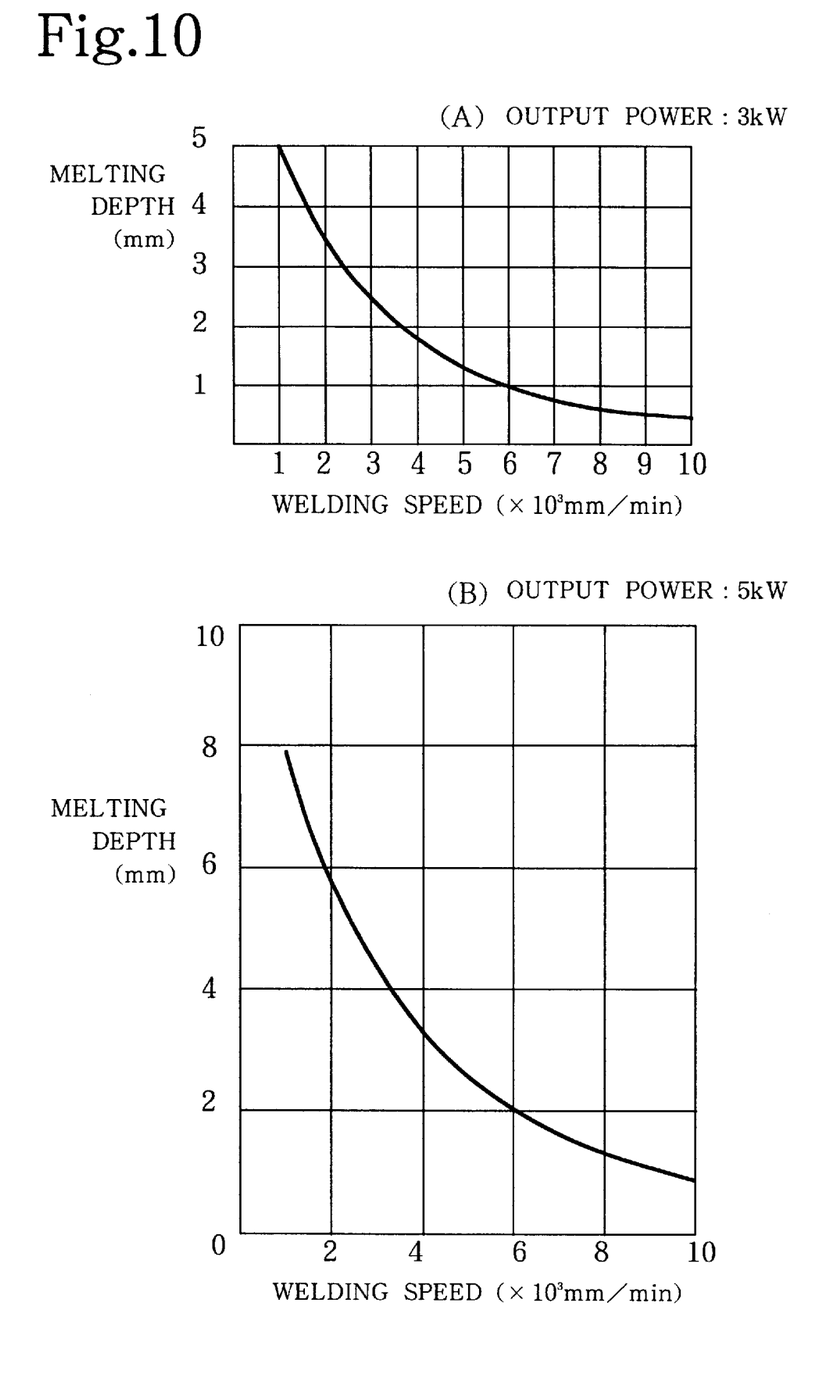
FIGS. 10(A)–10(D) are a graphs of a relation between melting depth and welding speed.

Next, a relation between conditions for the laser welding and an sticking state of the rubber is explained. FIG. 10 is a graph to determine the condition of the laser welding and melting depth. In (A) of FIG. 10, a relation between melting depth (ordinate) and welding speed (abscissa) is shown in a case using a laser of 3 kW output power, a parabolic reflector 10 having 10-inch diameter as a light-concentrating system, and helium as shielding gas. FIG. 10(B) is a similar graph in a case using the laser of 5 kW output power, the parabolic reflector having a 10-inch diameter as the light-concentrating system, and argon as shielding gas.

It is generally known in welding that the surface temperature depends on the welding speed and if the welding speed is proper, temperature distribution has no difference for output power. Therefore, the condition for the laser welding (output power and welding speed) can be easily determined using these graphs. For instance, in a case when the thickness of a welded material is 2.6 mm, since it is sufficient for the welding depth to be more than plate thickness, the welding depth is decided as 2.9 mm allowing for safety margin. Consequently, adequate welding speed in the case of 3 kW output power is decided as about 2500 mm/min from (A) of FIG. 10 and about 4500 mm/min in 5 kW output power from (B) of FIG. 10.

Figure 11:
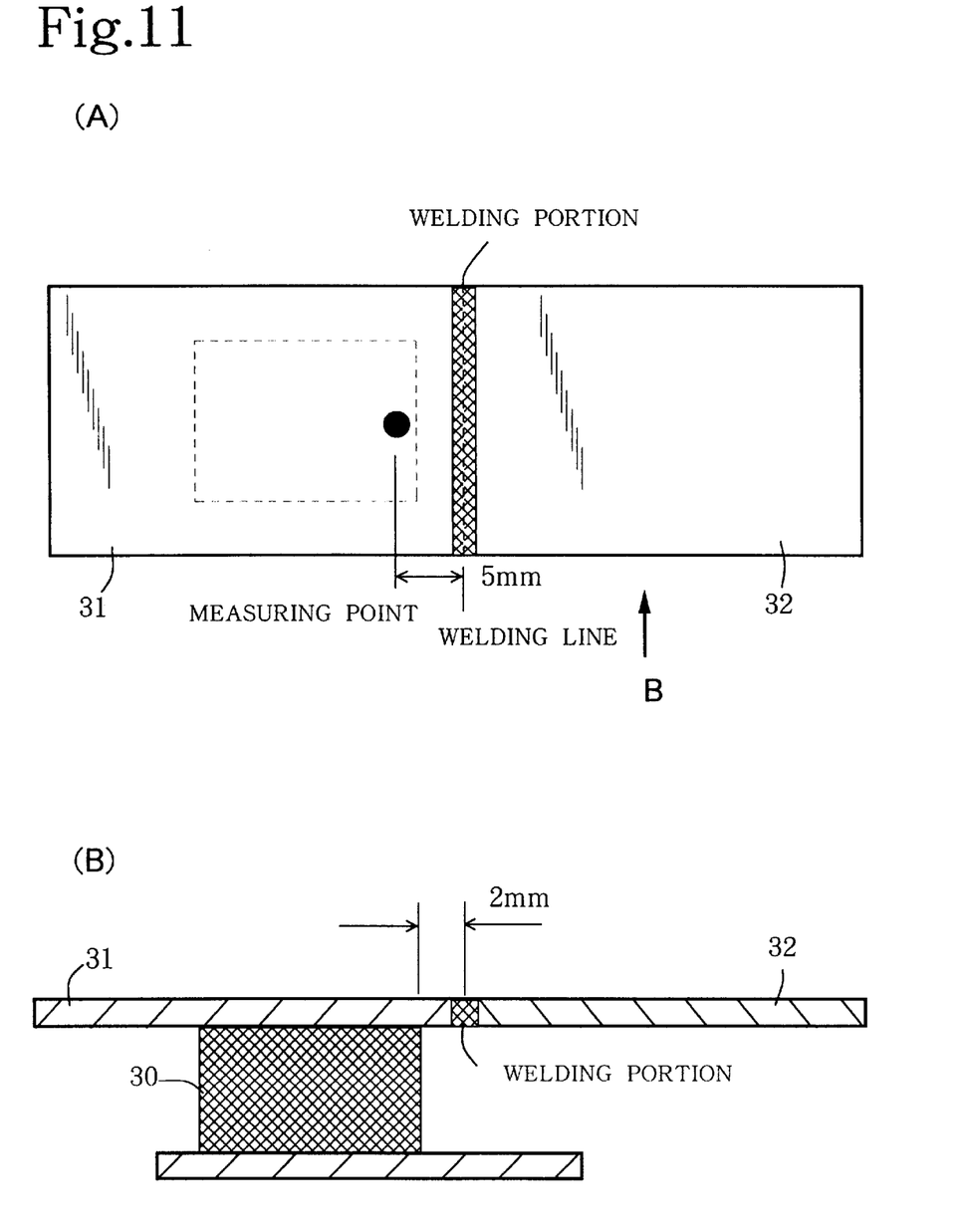
FIGS. 11(A) and 11(B) are views showing a test method to determine a surface temperature limit.

FIG. 11 is a view showing a test method to determine the surface temperature limit not giving bad influence to the vibration isolating rubber. In the method, an iron plate 31 having 2.6 mm thickness is stuck with a sample rubber 30. An end face of an iron plate 32 having the same thickness and of same material as the iron plate 31 is made to confront to an end face of the iron plate 31 projecting toward a position 2 mm away from an end portion of the sample rubber 30. While the confronted portion is laser welded, the surface temperature of the iron plate 31 is measured at a measuring point 5 mm away from a welding line and the sticking state of the sample rubber 30 with the iron plate 31 is tested. In FIG. 11, (A) is a plan view of the sample and (B) is a side view thereof (drawing viewed from an arrow B direction in (A) of FIG. 11). Selection of the measuring points is optional.

Figure 12:
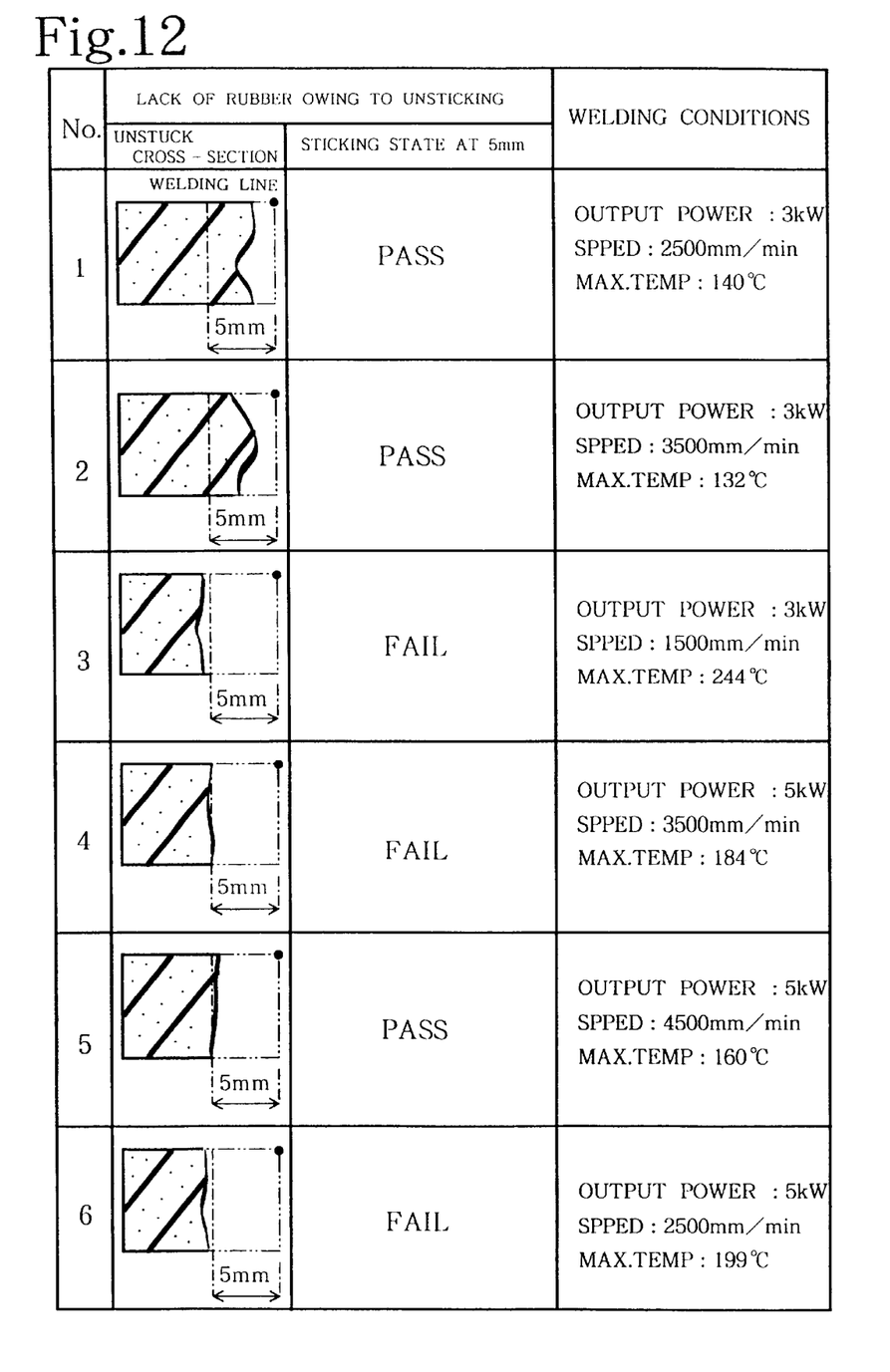
FIG. 12 is a table of the test results thereof.

FIG. 12 shows results of the sticking test to decide relations of the surface temperature and sticking state of the sample rubber at 5 mm point away from the welding line in respective six conditions of No. 1 through No. 6.

In FIG. 12, No. 1 through No. 3 show the results that the laser welding were performed at common 3 kW output power and at respective welding speed of 2500 mm/min, 3500 mm/min, and 1500 mm/min. Similarly, No. 4 through No. 6 show the results that the laser welding were done at common 5 kW output power and at respective welding speed of 3500 mm/min, 4500 mm/min, and 2500 mm/min.

From synthesizing the results of FIG. 12 and the previously determined adequate welding speed, it is found out that conditions No. 1 and No. 5 are adequate and a good sticking state can be maintained in the case that the surface temperature is less than 160° C. Thereby, maximum surface temperature that can keep such a good sticking state is defined as a surface temperature limit. Incidentally, condition No. 2 passes in the sticking state, but is not adequate in a point where the welding speed is too slow.

Figure 13:
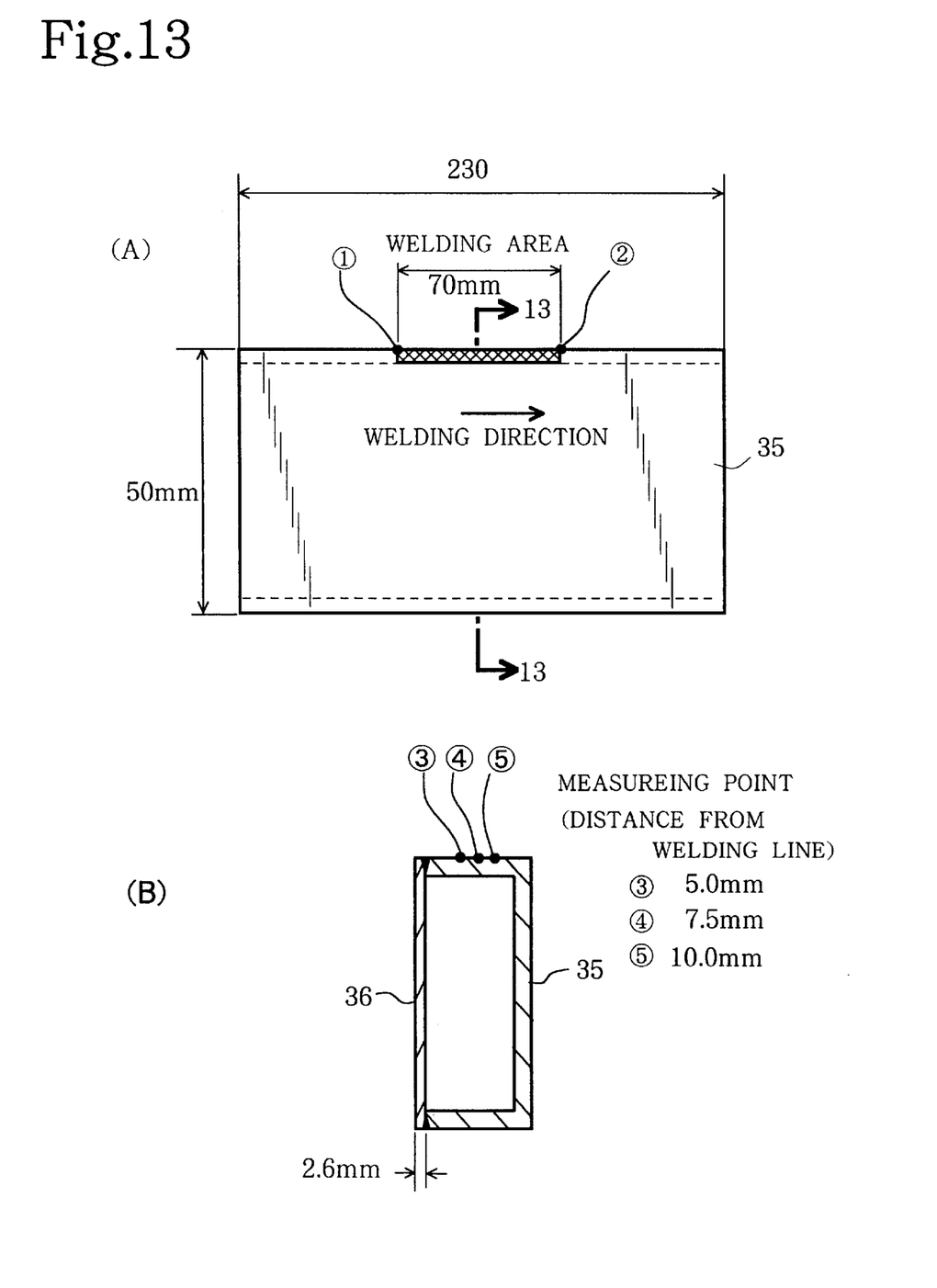
FIGS. 13(A) and 13(B) are views showing a test method to determine an adequate distance.

FIG. 13 is a drawing to explain a test method to determine a distance from the welding line which offers the surface temperature limit agreeable to the condition that the surface temperature is less than 160° C. In this test an iron plate 36 having 2.6 mm thickness is overlapped on an end face of a test piece 35, which is made of an iron block having same weight as an engine mount and having the shape on one side that is not a square in a cross-section, and then the overlapped portion is laser welded. In the FIG. 13, (A) shows a plan view of the test piece 35 and (B) shows a cross-sectional view of a middle portion in the welding area taken on line 13—13 in (A) of FIG. 13.

As shown in (A) of FIG. 13, the test piece 35 is welded at two conditions of 3 kW and 5 kW output power on an actual welding length of 70 mm along an edge in a longitudinal direction of the test piece 35. At the same time, the surface temperature is measured at measuring points ① through ⑤. In the measuring points, ① is a starting point of the welding and ② is an ending point thereof. Each points are set 5 mm apart from the welding line and seen as overlapping with point ③ in (B) of FIG. 13 . Further, ③ is a point 5 mm apart from a center of the welding line, and ④ and ⑤ are points set at each 2.5 mm interval from ③ toward the cross-sectional direction.

Figure 14:
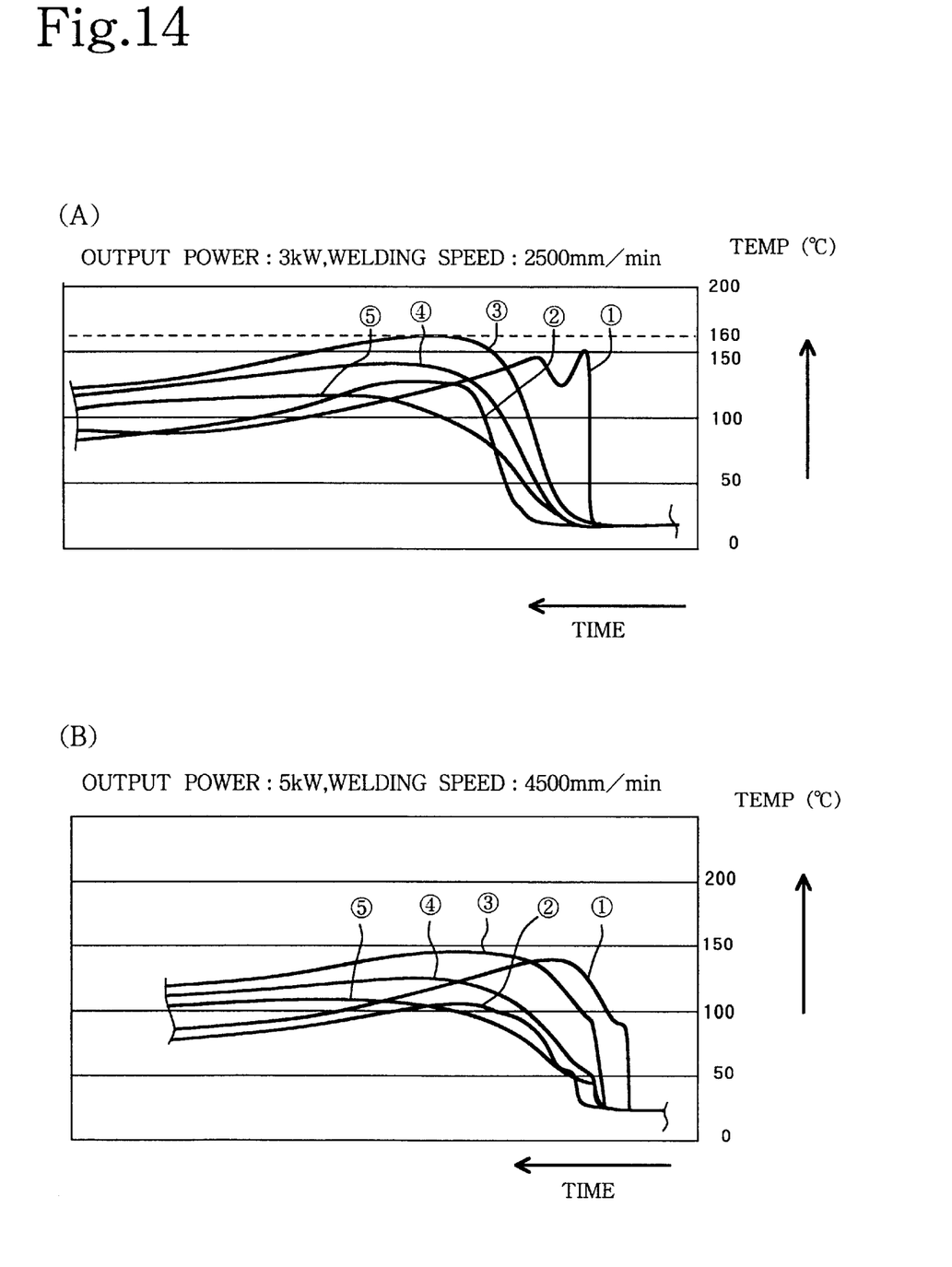
FIGS. 14(A) and 14(B) are graphs of the surface temperature measured on the various test points.

FIG. 14 is a graph on which the measured results of above described test are recorded at each conditions with temperature (° C.) in ordinate and laps of time in abscissa exhibiting the surface temperature variation in time at each of the measuring points. The conditions of FIG. 14(A) are output power 3 kW and the welding speed 2500 mm/min and that of FIG. 14(B) are 5 kW and 4500 mm/min.

Consequently, taken into consideration FIG. 14, since the surface temperature limit in either case is less than 160° C. at the measuring point ④, namely a point 7.5 mm apart from the welding line, this distance is decided as the adequate distance L. Therefore, it is sufficient for the purpose as long as the construction of the outer cylinder and the bracket is designed such that the welding is practiced on the position the adequate distance L apart from the end portion of the vibration isolating rubber. Additionally, when the output power is 3 kW, since the surface temperature limit is about 160° C. at the measuring point ③ (a point 5 mm apart from the welding line), it is possible to assume 5 mm to be an adequate distance. But, if allowing for safety, it is required to select ④ of 7.5 mm distance.

Each welding condition decided by the aforementioned process varies with welded material, conditions in the laser welding (output power and welding speed), composition of the rubber, and so on. However, even in the various conditions, the adequate distance L can be decided by way of above mentioned process. That is, first, the melting depth is determined from thickness of the welded material and based on which the conditions of laser welding (the output power and adequate welding speed) are determined. Next, the surface temperature limit varying with composition of the rubber is decided as similar way as in FIG. 11 and FIG. 12. Thereafter, according to these laser welding conditions (the output power and the adequate welding speed) and the surface temperature limit, the adequate distance L is decided by means of the steps shown in FIG. 13 and FIG. 14 allowing for safety. In this way, even in various conditions, the adequate distance can be determined.

INDUSTRIAL APPLICABILITY

The present invention is applicable to a case that a bracket is welded to a cylindrical outer cylinder having vibration isolating function. In a vibration isolating device relating to the present invention, there are various kinds of the vibration isolating device for an engine mount, a suspension mount and the like in various kinds of vehicle such as a car and the like.

What is claimed is:

1. A method of manufacturing a cylindrical vibration isolating rubber device having a vibrating isolating functional member including a metal outer cylinder, a metal inner cylinder provided inside of the outer cylinder and a vibration isolating rubber positioned between the outer cylinder and the inner cylinder and a fixing bracket welded to the outer cylinder, comprising the following steps:

forming the vibration insulating functional member;

placing the fixing bracket on an axial end portion of the outer cylinder projecting toward a position to avoid thermal damage to the vibration isolating rubber; and laser welding a joint portion between the axial portion of the outer cylinder and the fixing bracket while avoiding thermal damage to the vibration isolating rubber during laser welding.

2. The method of manufacturing according to claim 1, and further including the step of preventing thermal damage to the vibration isolating rubber by extending axially outwardly an axial end portion of the outer cylinder from the vibration isolating rubber and laser welding a joint portion of an end face of the outer cylinder and the fixing bracket.

3. The method of manufacturing according to claim 1, and further including the step of forming an axial end portion of the outer cylinder as a flange bent radially outwardly from the outer cylinder such that the end face of the fixing bracket is placed at the position to avoid thermal damage to the rubber and laser welding a joint portion of an end face of the flange and the fixing bracket.

4. The method of manufacturing according to claim 1, and further including the steps of:

setting a melting depth by laser welding to be thicker relative to a thickness of a welded material;

determining a laser output power and adequate welding speed according to the melting depth;

determining a surface temperature limit according to composition of the vibration isolating rubber;

determining an adequate distance from a welded line to a point to become less than the surface temperature limit when being welded with the selected laser output power and the adequate welding speed; and determining a position to keep the adequate distance from the vibration isolating rubber as a position to avoid thermal damage to the rubber.

5. The method of manufacturing according to claim 2, and further including the steps of:

setting a melting depth by laser welding to be thicker relative to a thickness of a welded material;

determining a laser output power and adequate welding speed according to the melting depth;

determining a surface temperature limit according to composition of the vibration isolating rubber;

determining an adequate distance from a welded line to a point to become less than the surface temperature limit when being welded with the selected laser output power and the adequate welding speed; and determining a position to keep the adequate distance from the vibration isolating rubber as a position to avoid thermal damage to the rubber.

6. The method of manufacturing according to claim 3, and further including the steps of:

setting a melting depth by laser welding to be thicker relative to a thickness of a welded material;

determining a laser output power and adequate welding speed according to the melting depth;

determining a surface temperature limit according to composition of the vibration isolating rubber;

determining an adequate distance from a welded line to a point to become less than the surface temperature limit when being welded with the selected laser output power and the adequate welding speed; and determining a position to keep the adequate distance from the vibration isolating rubber as a position to avoid thermal damage to the rubber.

7. The method of manufacturing according to claim 1, and further including the steps of:

setting a melting depth by laser welding to be thicker relative to a thickness of a welded material;

performing an experiment for determining a laser output power and adequate welding speed according to the melting depth;

performing an experiment for determining a surface temperature limit according to composition of the vibration isolating rubber;

performing an experiment for determining an adequate distance from a welded line to a point to become less than the surface temperature limit when being welded with the selected laser output power and the adequate welding speed; and performing an experiment for determining a position to keep the adequate distance from the vibration isolating rubber as a position to avoid thermal damage to the rubber.

8. The method of manufacturing according to claim 2, and further including the steps of:

setting a melting depth by laser welding to be thicker relative to a thickness of a welded material;

performing an experiment for determining a laser output power and adequate welding speed according to the melting depth;

performing an experiment for determining a surface temperature limit according to composition of the vibration isolating rubber;

performing an experiment for determining an adequate distance from a welded line to a point to become less than the surface temperature limit when being welded with the selected laser output power and the adequate welding speed; and performing an experiment for determining a position to keep the adequate distance from the vibration isolating rubber as a position to avoid thermal damage to the rubber.

9. The method of manufacturing according to claim 3, and further including the steps of:

setting a melting depth by laser welding to be thicker relative to a thickness of a welded material;

performing an experiment for determining a laser output power and adequate welding speed according to the melting depth;

performing an experiment for determining a surface temperature limit according to composition of the vibration isolating rubber;

performing an experiment for determining an adequate distance from a welded line to a point to become less than the surface temperature limit when being welded with the selected laser output power and the adequate welding speed; and performing an experiment for determining a position to keep the adequate distance from the vibration isolating rubber as a position to avoid thermal damage to the rubber.

* * * * *